(12) United States Patent
Huang

(10) Patent No.: US 7,286,217 B2
(45) Date of Patent: Oct. 23, 2007

(54) POWER DRIVEN COAXIAL-ROTATING FAST-ORIENTATION SYSTEM AND METHOD

(75) Inventor: Chiao-Chung Huang, Taoyuan Hsien (TW)

(73) Assignee: AU Optronics Corp., Hsinchu (TW)

( * ) Notice: Subject to any disclaimer, the term of this patent is extended or adjusted under 35 U.S.C. 154(b) by 417 days.

(21) Appl. No.: 10/836,272

(22) Filed: May 3, 2004

(65) Prior Publication Data

US 2004/0239625 A1 Dec. 2, 2004

(30) Foreign Application Priority Data

May 30, 2003 (TW) .............................. 92114704 A

(51) Int. Cl.
*G01N 21/00* (2006.01)

(52) U.S. Cl. .................................... 356/237.1

(58) Field of Classification Search ............... 356/614, 356/401, 349; 359/362
See application file for complete search history.

(56) References Cited

U.S. PATENT DOCUMENTS

| | | | |
|---|---|---|---|
| 4,086,704 A * | 5/1978 | Masaichi | 33/642 |
| 4,402,576 A * | 9/1983 | Stahl et al. | 359/393 |
| 4,711,537 A * | 12/1987 | Schindl et al. | 359/393 |
| 6,018,415 A * | 1/2000 | Woo et al. | 359/393 |
| 6,049,420 A | 4/2000 | Kraft | 359/393 |
| 6,920,803 B2 * | 7/2005 | Hasegawa | 74/89.22 |
| 2002/0080240 A1 | 6/2002 | Omi | 348/207 |

FOREIGN PATENT DOCUMENTS

| | | |
|---|---|---|
| JP | 55-20204 | 5/1980 |
| JP | 2002-196248 | 7/2002 |

\* cited by examiner

*Primary Examiner*—Tarifur Chowdhury
*Assistant Examiner*—Isiaka O Akanbi
(74) *Attorney, Agent, or Firm*—Troxell Law Office, PLLC

(57) ABSTRACT

A power driven coaxial-rotating fast-orientation system and method is disclosed herein. The system includes a shiftable plate, an X-Y-axis driving device, a coaxial-rotating device, a coordinate indicator and a fixed microscope. The driving device moves the shiftable plate in X and/or Y-axis direction. The coaxial-rotating device load the display panel and enabling a coordinate alignment process performed thereto. The coordinate indicator is used to show the coordinate of the observed cell even if the panel is moving, so the object TFT cell can be located with reference to the value on the coordinate indicator. The cross mark from the view provided by the microscope can be used as a reference coordinate when adjusting the position of the display panel, and also available when searching intersection of the gate-lines and signal-lines with the corresponding numbers relating to the defective object cell on the display panel. When performing sample analysis from a TFT LCD panel, the power driven coaxial-rotating fast-orientation system can provide an accurate and effective orientation method.

14 Claims, 2 Drawing Sheets

POWER DRIVEN COAXIAL-ROTATING FAST-ORIENTATION SYSTEM AND METHOD

TECHNICAL FIELD

This invention relates to a power driven coaxial-rotating fast-orientation system and method, more particularly, when a sample of the thin film transistor liquid crystal (TFT LCD) display device (e.g., display panel) is provided for handle, evaluation, failure analysis or other operation, the system and method according to the present invention can efficiently complete orientation of the TFT LCD display panel.

BACKGROUND

Because the TFT LCD generates very little radiation, and it is compact as well as power saving, accompanied with the progress in manufacturing TFT, the liquid crystal display (LCD) display panel is widely used in electronic products such as calculator, personal digital assistance, watch, lap top computer, digital camera, cellular phone, video product (e.g., monitor and television set) and the like. In addition, the manufacturer's investment has been placed in researching and developing equipment supporting the LCD display panel of bigger dimension, thus makes its' cost down, and stimulate its' need in market.

As to production, it takes a lot of time to find defects (defective cells) in a TFT panel, for example, when performing an analysis to a sample from a production line of TFT panel, such as an electricity test, the electricity of each of the gate-lines and signal-lines of a TFT panel must be obtained. Then judge from the reading of each of the electricity of each of the gate-lines and signal-lines, if anything abnormal is found, the number of the relative gate-line and signal-line will be marked and recorded. Thus the intersection of the marked gate-line and signal-line is marked as defective, and the number of gate-line, e.g. G100, and number of signal-line, e.g. S100, will be recorded, such as (G100, S100). Perform the process until all the defectives of the TFT are located, such as (G100, S100), (G100, S200) and (G200, S300), then use laser marker to mark around the defective TFT cell. After the defective TFTs had been located, the subsequent analysis using Scanner Electron Microscopy (SEM) or Focused Ion Beam (FIB) can be performed to inspect the marked defective TFTs.

Manually locating the defective TFTs are performed by an operator, who reads the number of gate-line and signal-line of responding defective TFTs, such as (G100, S100), (G100, S200) and (G200, S300), and then mark the defective TFTs one by one with a laser marker under the microscope. It takes a lot of time to find each of the defective TFTs, e.g., from around 30 minutes to 3 hours, it depends on whether the location of the defective TFT is at the center or at the edge of the TFT plate. Furthermore, no one can guarantee 100% accuracy in the forgoing operation, especially when it is a manual operation.

Accordingly, when performing sample analysis to a TFT LCD display panel, in order to save the time for finding and locating a defective TFT cell, and to increases its' accuracy, it is essential to develop a method and apparatus to improve locating the defective TFTs.

SUMMARY OF THE INVENTION

One of the purposes of the present invention is to provide a power driven coaxial-rotating fast-orientation system and method to efficiently and precisely locate a specific tiny object on a panel.

The first aspect of one of the preferred embodiments of the present invention discloses a fast orientation system with power driven coaxial-rotating device, which can be used to locate a tiny object (such as TFT cell) on a panel (TFT display panel) having numbered gate-lines and signal-lines installed in matrix arrangement. The fast-orientation system includes a shiftable plate, an X-Y-axis driving device, a coaxial-rotating device, a coordinate indicator and a fixed microscope. The driving device is mechanically coupled to the shiftable plate, and drives the shiftable plate in X-axis and/or Y-axis direction. The coaxial-rotating device loads the display panel and enabling a coordinate alignment process performed thereto. The coordinate indicator is coupled to the shiftable plate, and is used to show the coordinate of the observed cell even when the panel is moving, so the object TFT cell can be located with reference to the value on the coordinate indicator. The microscope is installed on the above of the shiftable plate. The mark (a cross mark in one of the preferred embodiments of the present invention) from the view provided by the microscope can be used as a reference coordinate when adjusting the position of the display panel, and also available when searching intersection of the gate-lines and signal-lines with the corresponding numbers relating to the defective object cell on the display panel.

The second aspect of one of the preferred embodiments of the present invention discloses a fast orientation method to fast locate an object on a panel. At first, place a panel on a shiftable plate, then perform a coordinate alignment process by using a mark provided by the microscope installed above the shiftable plate, thus enabling gate-lines and signal-lines on the display panel parallel to horizontal and perpendicular lines of the cross mark respectively. Next, use the X-Y-axis driving device to drive the display panel on the shiftable plate moving in X-axis and/or Y-axis, accompanied with the cross mark provided by the microscope to search a gate-line corresponding to the object on the display panel, the X-Y-axis driving device is coupled to the shiftable panel. Then record Y-axis value shown on the coordinate value illustrating device as y1. The coordinate value illustrating device can dynamically illustrate the coordinate value on X-axis and Y-axis of the shiftable plate even when the display panel is moving, in addition, the coordinate value illustrating device can also illustrate coordinate value of the object defective cell. Subsequently, use the X-Y-axis driving device to drive the display panel on the shiftable plate, accompanied with the mark provided by the microscope to search a signal-line number corresponding to the object on the display panel. Then record X-axis value shown on the coordinate value illustrating device as x1. Finally move the shiftable plate to a position that the coordinate value illustrating device illustrates (x1, y1), thus enabling the object to be placed under the intersection of the cross mark provided by the microscope.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1:
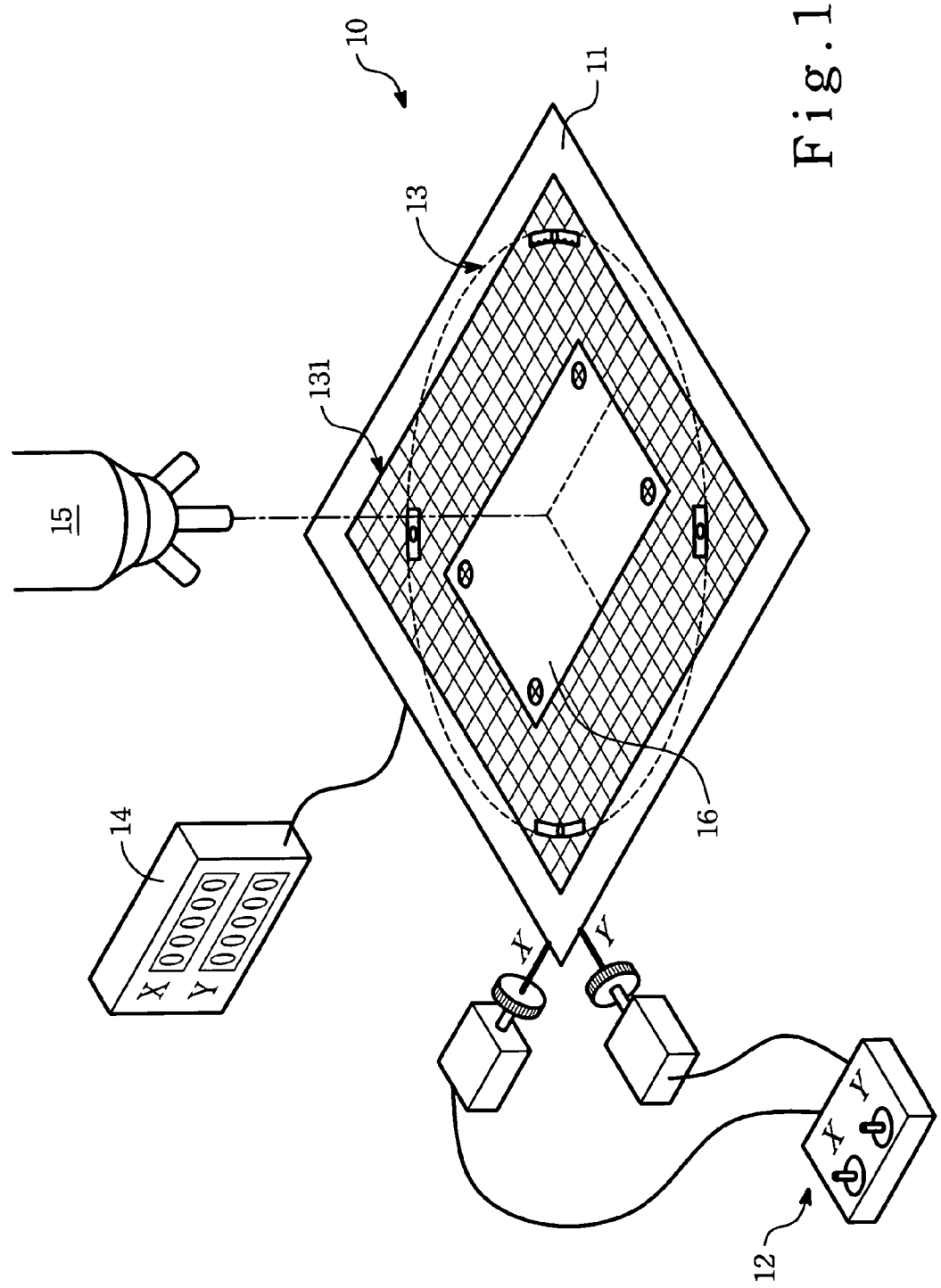
FIG. 1 is a schematic illustration of the power driven coaxial-rotating fast-orientation system according to one preferred embodiment of the present invention.
Figure 2A:
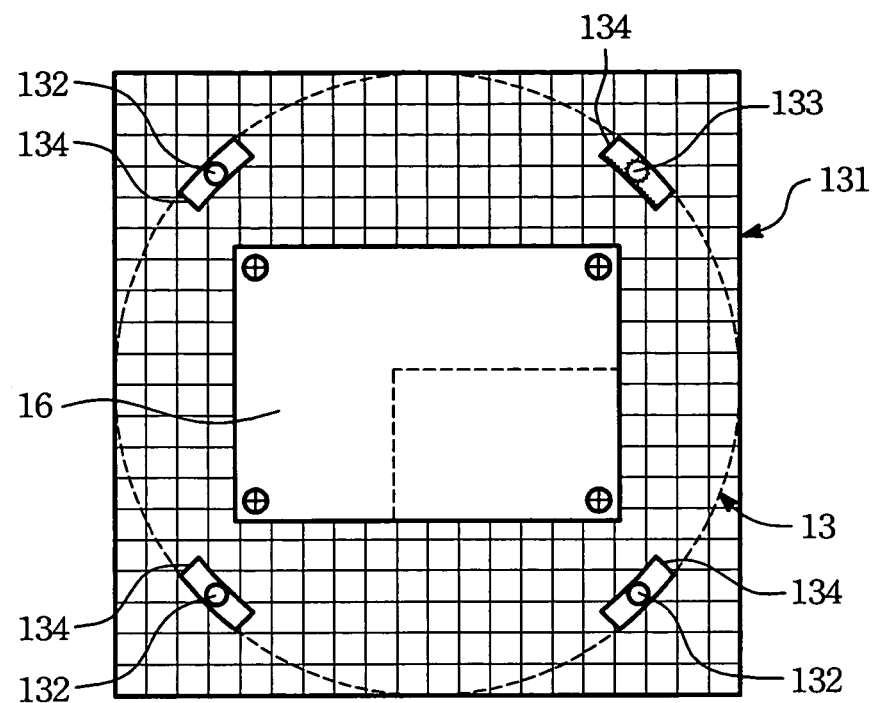
FIG. 2a illustrates a top plan view of the coaxial-rotating device of the power driven coaxial-rotating fast-orientation system according to one preferred embodiment of the present invention.
Figure 2B:
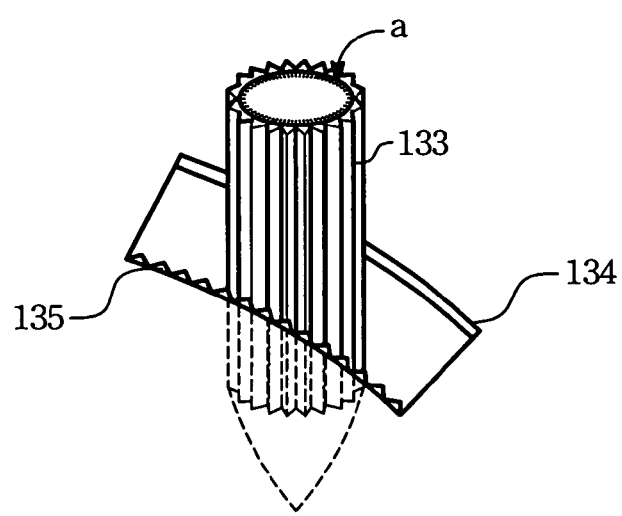
FIG. 2b is a prospective view of a fine-adjustment gear set of the coaxial-rotating device according to one preferred embodiment of the present invention.

As schematically illustrated in FIG. 1, the power driven coaxial-rotating fast-orientation system 10 according to one of the preferred embodiment of the present invention includes a shiftable device 11, an X-Y-axis driving device 12, a coaxial-rotating device 13, a coordinate indicator 14 and a microscope 15. The X-Y-axis driving device 12 is physically coupled to the shiftable device 11, which is used to load and drive the coaxial-rotating device 13 placed thereon. The coordinate indicator 14 is coupled to the shiftable device 11, and is used to illustrate the (X, Y) value of the coordinate of an observed tiny object placed on the shiftable device 11, especially when the X-Y-axis driving device 12 is shifting the shiftable device 11, the coordinate indicator 14 can also perform its' function. In one preferred embodiments of the present invention, the observed tiny object can be an element (cell) of a TFT LCD display panel 16. Referring to FIG. 2a, the coaxial-rotating device 13 according to one of the preferred embodiments of the present invention includes a grid-patterned plate 131, three positioning posts 132 and a fine adjustment gear 133 with scale a (referring to FIG. 2b) on it. Now turning back to FIG. 2a, the TFT LCD display panel 16 is loaded on the grid-patterned plate 131 having four separate corners with four arc slots 134 respectively carved thereupon. In addition, the four arc slots 134 are formed on and to match the edge of a circle (e.g., the dashed circle in FIG. 2a), and are inserted as well as geared into the three positioning posts 132 and the fine adjustment gear 133 respectively. Furthermore, one terminal of each of the three positioning posts 132 and the fine adjustment gear 133 are connected to the shiftable device 11 (not shown in FIG. 2A). FIG. 2b schematically illustrates the three dimensional diagram of the fine adjustment gear 133, which is adopted by the arc slot 134 having toothed edge 135 engaging the fine adjustment gear 133. By turning the fine adjustment gear 133, the engaged toothed edge 135 is shoved, and thus the spinning of the grid-patterned plate 131 is made possible. The resulted turning angle of the grid-patterned plate 131 can be determined by the reading on scale a, and which made the adjustment of coordinate alignment much more easier. The microscope 15 is installed above the shiftable device 11, and provides a mark (which is a cross mark in one preferred embodiments of the present invention and is not shown) to the view of the user to the microscope 15. The mark (cross mark) is used as the reference coordinate when adjusting the TFT LCD display panel 16 using the fine adjustment gear.

The power driven coaxial-rotating fast-orientation system 10, as shown in FIG. 1, enable the operator to locate the object TFT cell on the display panel 16 by the intersection of the gate-line and signal-line, thus the operator can accurately and efficiently use laser to mark the located object TFT cell.

At first, perform a coordinate alignment process, it is to place the display panel 16 on the grid-patterned plate 131 of the coaxial-rotating device 13, then align the cross mark at each corner of the display panel 16 to the coordinate X and Y of the grid-patterned plate 13. In other words, the process—four corners alignment adjustment can make the horizontal and perpendicular direction of display panel 16 approximately parallel to the X-axis and Y-axis respectively. Subsequently, turn the fine adjustment gear 133 having the scale a, utilizing the reference coordinate of the cross mark provided by the microscope 15 as a base, to make the gate-line (horizontal line) and signal-line (perpendicular line) parallel to the lines of the cross mark respectively. Thus the gate-lines and the signal-lines are parallel to the X coordinate and Y coordinate referred to the coordinate indicator 14 respectively, in other words, when the display panel 16 was moving along with a gate-line, the value on the Y-axis shown on the coordinate indicator 14 remains constant.

Based on the recorded numbers of gate-lines and signal lines of corresponding defective TFT cells, a locating process can be performed. Using the horizontal driving device 12 to move the display panel 16 on the shiftable plate 11, in addition, aligning the cross mark provided by the microscope 15 to a number of recorded gate-line (e.g., G100, corresponding to a recorded defective TFT cell) shown at the side of the display panel 16, the Y value on the coordinate indicator 14 is then recorded as y1. Next, move the display panel 16 on the shiftable plate 11 and align the cross mark provided by the microscope 15 to a number of recorded signal-line (e.g., S100, of the forgoing defective TFT cell) shown at the side of the display panel 16, the X value on the coordinate indicator 14 is then recorded as x1. So the shiftable plate 11 can be driven to the place where the reading on the coordinate indicator 14 matching the recorded (x1, y1) value, and the microscope 15 is placed right above a TFT cell such that the intersection of the cross mark in the view of the microscope 15 is aligned to the forgoing recorded defective TFT cell. Then use a laser marker to mark around the first defective object TFT cell. Subsequently, based on different sets of recorded number of gate-lines and signal-lines, performing the forgoing locating process to mark all the defective TFT cells, e.g., performing the locating process to find and mark the second defective object TFT cell at the position (G100, S200), until all the defective object TFT cells are marked. When all defective object TFT cells on the display panel 16 have been marked, then the SEM or FIB analysis can be performed to the display panel 16.

Searching for the defective TFT cells to be processed by laser marking and SEM or FIB analysis process is a time-consuming and exhausting process for the operator in the prior art, however, using the power driven coaxial-rotating fast-orientation system according to the preferred embodiment of the invention can lower the searching time to the extent from one-tenth to one-sixtieth of that in the prior art. In other words, the searching time for the present invention is one-tenth to one-sixtieth of that of the prior art, it takes only 3 to 5 minutes for the present invention to search all defective TFT cells, and the accuracy of the present invention is 100%. In addition, display panel of any dimension can be fit to the present invention, even off-line application, such as analysis proceeded in laboratory, can be performed on the power driven coaxial-rotating fast-orientation system in the present invention. According to the description mentioned above, the power driven coaxial-rotating fast-orientation system and method in the present invention can not only greatly save searching time for the defective object TFT cells, but also creditably increase its accuracy.

While there have been described above the principles of the present invention in conjunction with specific devices, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. Apparatus for locating an object on a display panel comprising matrix-installed gate-lines and signal-lines with corresponding numbers marked thereto, said apparatus comprising:

a shiftable plate;

X-Y-axis driving means for driving said shiftable plate moving in X-axis or Y-axis, said X-Y-axis driving means being mechanically coupled to said shiftable plate to enable horizontal movement of said shiftable plate;

coaxial-rotating means for placing said display panel thereon and performing coordinate alignment process thereto and having a grid-patterned plate, at least three slots being carved at three corners of said grid-patterned plate respectively, said three slots being made to match circumference of a circle, grid on said grid-patterned plate being used as reference coordinate when performing said coordinate alignment process in coarse adjusting coordinate of said display panel; and at lease three positioning posts being adapted by said at least three slots, one terminal of each of said at least three positioning posts being fixed on said shiftable plate, one of said positioning posts being formed as a fine adjustment gear having toothed circumference engaging to a tooth edge at inner edge of one of said at least three slots, the other of said at least three positioning posts having diameter matching width of said at least three slots, and enabling said positioning posts smoothly slide within corresponding slots, said toothed edges being forced to move by turning said fine adjustment gear, thus enabling said shiftable plate to move in angular direction, said coaxial-rotating means being installed on said shiftable plate and coupled thereto;

coordinate value illustrating means for dynamically showing coordinate value of X axis and Y axis of said shiftable plate especially when said display panel is moving, thus locating said object by tracing intersection of gate-lines and signal-lines with said corresponding numbers, said coordinate value illustrating means being coupling to said shiftable plate; and a microscope for providing a cross mark in its view, thus providing reference coordinate to said coaxial-rotating means when adjusting position of said display panel to align with coordinate of said coaxial-rotating means, and to find gate-line and signal-line number on said display panel corresponding to said object, said microscope having a fixed position being installed above said shiftable plate.

2. The apparatus as claim 1, wherein said fine adjustment gear has a scale for determining an turning angle of the spinning of said shiftable plate, thus enabling fine adjustment to the coordinate alignment performed to the display panel.

3. The apparatus as claim 1, wherein said display panel is a thin film transistor (TFT) liquid crystal display (LCD).

4. The apparatus as claim 1, wherein said mark is a cross mark.

5. A method using the apparatus as claim 1 for locating an object on a display panel comprising matrix-installed gate-lines and signal-lines with corresponding numbers marked thereto, said method comprising steps of:

placing said display panel on the shiftable plate;

performing a coordinate alignment by using a mark provided by the microscope installed above said shiftable plate to enable gate-lines and signal-lines parallel to said mark respectively, wherein said gate-lines and said signal-lines are on said display panel;

driving said display panel on said shiftable plate moving in X-axis and/or Y-axis by using X-Y-axis driving means, accompanying with the mark to find a gate-line number corresponding to said object on the display panel, said X-Y-axis driving means being coupled to said shiftable panel;

recording Y-axis value shown on coordinate value illustrating means as y1, said coordinate value illustrating means dynamically illustrating coordinate value of X-axis and Y-axis of said shiftable plate, and said coordinate value illustrating means also illustrate coordinate value of said object;

searching a signal-line number corresponding to said object on the display panel by using said X-Y-axis driving means for driving said display panel on said shiftable plate, accompanying with the mark;

recording X-axis value shown on said coordinate value illustrating means as x1; and moving said shiftable plate to a position that said coordinate value illustrating means illustrates (x1, y1), thus enabling said object to be placed under the intersection of said mark.

6. The method as claim 5, wherein said coordinate alignment process is performed by adjust placement of said display panel, said adjustment is performed by conforming four marks on four respective corners of said display panel to the X-axis and Y-axis on said grid-patterned plate.

7. The method as claim 5, wherein said fine adjustment gear has a scale for determining an turning angle of the spinning of said shiftable plate, thus enabling fine adjustment to the coordinate alignment performed to the display panel.

8. The method as claim 5, wherein said mark is a cross mark.

9. The method as claim 5, wherein said display panel is a thin film transistor (TFT) liquid crystal display (LCD).

10. Apparatus for locating a marker denoted on a display panel, said display panel having matrix-installed gate-lines and signal-lines thereto, said apparatus comprising:

a shiftable plate;

X-Y-axis driving means for driving said shiftable plate along X-axis or Y-axis, said X-Y-axis driving means being mechanically coupled to said shiftable plate to enable said shiftable plate horizontal movement;

coaxial-rotating means being installed on said shiftable plate supporting and providing said display pane performing a circular motion by means of at least three slots along a circumference of a circle formed therein and at least three corresponding positioning posts inserted through said slots and at least one of said positioning posts being formed as a fine adjustment gear and a corresponding slot thereof having a rack formed along an edge clenched teeth therewith said fine adjustment gear while said coaxial-rotating means making an angular adjustment;

coordinate value illustrating means for showing a X-axis and Y-axis coordinate of said shiftable plate and locating said object by tracing an intersection of the gate-lines and the signal-lines with said corresponding numbers, said coordinate value illustrating means being coupling to said shiftable plate; and a microscope having a cross mark on an eyepiece, said microscope provided for searching an object marked on said display panel.

11. The apparatus as claim 10, wherein said coaxial-rotating means further comprises a grid pattern formed on said shiftable plate.

12. The apparatus as claim 10, wherein said fine adjustment gear further comprising a scale rule used to determine a rotating angle of said shiftable plate, thus enabling fine adjustment of the display panel against the coordinate.

13. A method for locating an object on a display panel comprising matrix-installed gate-lines and signal-lines with corresponding numbers marked thereto, said method comprising steps of:

placing said display panel on a shiftable plate;

aligning said display panel with any one of said gate-lines and signal-lines thereof, respectively parallel to a cross mark of an eyepiece of a microscope by rotating said display panel using a fine adjustment gear of a coaxial-rotating means;

using X-Y-axis driving means for driving said shiftable plate moving along a Y-axis so as to locate a predetermine gate-line number of said object on said display panel matched with said mark of said eyepiece;

recording a Y axis value shown on coordinate value illustrating means as y1, said coordinate value illustrating means dynamically showing a coordinate value of X axis and Y axis of said shiftable plate; and using said X-Y-axis driving means for driving said shiftable plate moving along a X-axis so as to locate a predetermine signal-line number of said of said object on said display panel match with said mark of said eyepiece;

recording X axis value shown on said coordinate value illustrating means as x1;

whereby said object is located as a coordinate (x1, y1 )

wherein said coaxial-rotating means installed on said shiftable plate, said coaxial-rotating means comprises:

a grid-patterned plate for loading said display panel, at least three slots being carved at three corners of said grid-patterned plate respectively, said three slots being made to match a circumference of a circle, grid on said grid-patterned plate being used as reference coordinate when performing said coordinate alignment process in coarse adjusting coordinate of said display panel; and at least three positioning posts being adapted by said at least three slots, one terminal of each of said at least three positioning posts being fixed on said shiftable plate, one of said positioning posts being formed as a fine adjustment gear having toothed engaging to a tooth edge at inner edge of one of said at least three slots, the others of said at least three positioning posts having a diameter matching with a width of said at least three slots, and enabling said positioning posts smoothly slide within corresponding slots, said toothed edges being forced to move by turning said fine adjustment gear, thus enabling said shiftable plate to move in angular direction.

14. The method as claim 13, wherein said coordinate alignment process is performed by coarsely adjust placement of said display panel, said coarsely adjustment is performed by conforming four cross marks on four respective corners of said display panel to the X-axis and Y-axis on said grid-patterned plate.

* * * * *